United States Patent
Inoue et al.

(10) Patent No.: US 9,687,814 B2
(45) Date of Patent: Jun. 27, 2017

(54) FIBROUS METAL-ADSORBING MATERIAL

(71) Applicant: NIPPON FILCON CO., LIMITED, Inagi-shi, Tokyo (JP)

(72) Inventors: Yoshinori Inoue, Inagi (JP); Toshifumi Katoh, Inagi (JP); Takehiro Kajiwara, Inagi (JP); Mitsuru Saito, Inagi (JP)

(73) Assignee: NIPPON FILCON CO., LIMITED, Tokyo (JP)

( * ) Notice: Subject to any disclaimer, the term of this patent is extended or adjusted under 35 U.S.C. 154(b) by 0 days.

(21) Appl. No.: 14/424,349

(22) PCT Filed: Aug. 26, 2013

(86) PCT No.: PCT/JP2013/072651
§ 371 (c)(1),
(2) Date: Feb. 26, 2015

(87) PCT Pub. No.: WO2014/038415
PCT Pub. Date: Mar. 13, 2014

(65) Prior Publication Data
US 2015/0224474 A1  Aug. 13, 2015

(30) Foreign Application Priority Data
Sep. 5, 2012 (JP) .................................. 2012-194640

(51) Int. Cl.

| | | |
|---|---|---|
| B01J 20/26 | (2006.01) | |
| B01J 20/30 | (2006.01) | |
| C02F 1/28 | (2006.01) | |
| C08F 8/30 | (2006.01) | |
| C08G 81/02 | (2006.01) | |
| D01D 5/08 | (2006.01) | |
| D01F 6/34 | (2006.01) | |
| B01J 20/28 | (2006.01) | |
| B01J 20/32 | (2006.01) | |
| B29C 47/00 | (2006.01) | |
| B29D 99/00 | (2010.01) | |
| C08L 23/06 | (2006.01) | |
| B29K 277/00 | (2006.01) | |
| B29K 279/00 | (2006.01) | |
| C02F 101/20 | (2006.01) | |

(52) U.S. Cl.
CPC ......... *B01J 20/3007* (2013.01); *B01J 20/261* (2013.01); *B01J 20/262* (2013.01); *B01J 20/265* (2013.01); *B01J 20/28023* (2013.01); *B01J 20/3014* (2013.01); *B01J 20/3085* (2013.01); *B01J 20/321* (2013.01); *B01J 20/327* (2013.01); *B01J 20/328* (2013.01); *B01J 20/3212* (2013.01); *B01J 20/3227* (2013.01); *B01J 20/3293* (2013.01); *B29C 47/0004* (2013.01); *B29C 47/0014* (2013.01); *B29D 99/0078* (2013.01); *C02F 1/28* (2013.01); *C02F 1/286* (2013.01); *C08F 8/30* (2013.01); *C08G 81/02* (2013.01); *C08L 23/06* (2013.01); *D01F 6/34* (2013.01); *B29K 2277/00* (2013.01); *B29K 2279/00* (2013.01); *B29K 2995/0068* (2013.01); *C02F 2101/20* (2013.01)

(58) Field of Classification Search
None
See application file for complete search history.

(56) References Cited

U.S. PATENT DOCUMENTS

2014/0332714 A1*  11/2014  Inoue ..................... B01J 20/264
                                                    252/180

FOREIGN PATENT DOCUMENTS

| JP | 49-186 A | 1/1974 |
|---|---|---|
| JP | 55-50032 A | 4/1980 |
| JP | 2-228332 A | 9/1990 |
| JP | 7-304878 A | 11/1995 |
| JP | 10-225643 A | 8/1998 |
| JP | 10-237717 A | 9/1998 |
| JP | 2001-113272 A | 4/2001 |
| JP | 2001-123381 A | 5/2001 |
| JP | 3247704 B2 | 1/2002 |

(Continued)

OTHER PUBLICATIONS

Polyvinylacetate description downloaded from www.carlroth.com/en/en/Chemicals/A-Z-Chemicals/P/Polyvinyl-acetate//Polyvinyl-acetate/p/000000010000ac0000020023_en on Apr. 2, 2016.*

(Continued)

*Primary Examiner* — Irina S Zemel
*Assistant Examiner* — Jeffrey Lenihan
(74) *Attorney, Agent, or Firm* — Westerman, Hattori, Daniels & Adrian, LLP

(57) ABSTRACT

Provided is a fibrous adsorbing material used for the adsorption and recovery of metals in a solution, which is a fibrous metal-adsorbing material that can be produced using existing production facilities without using special facilities or complicated operations, has high durability, is easy to diversify, and can be processed into various forms. The fibrous metal-adsorbing material is produced by a) a step of preparing an acrylate polymer having a large number of glycidyl groups in the molecule, b) a step of kneading a low-melting-point fiber matrix polymer therewith, c) a step of making the resulting mixture into a fibrous form by an melt-blend spinning method, and d) a step of allowing a long-chain ligand having an amino group or an imino group to react with glycidyl groups on the fiber surface to introduce a metal-adsorbing functional group. The fibrous metal-adsorbing material has high durability, is easy to diversify, and has various forms.

4 Claims, 3 Drawing Sheets

(56) References Cited

FOREIGN PATENT DOCUMENTS

| | | |
|---|---|---|
| JP | 2007-247104 A | 9/2007 |
| JP | 4119966 B2 | 7/2008 |
| JP | 2011-56349 A | 3/2011 |
| JP | 2011-56350 A | 3/2011 |
| WO | WO-2013111891 A1 * | 8/2013 |

OTHER PUBLICATIONS

International Search Report dated Nov. 5, 2013 issued in corresponding application No. PCT/JP2013/072651.

* cited by examiner

FIBROUS METAL-ADSORBING MATERIAL

TECHNICAL FIELD

The present invention relates to a method for producing a fibrous metal-adsorbing material that is suitable for the adsorption and recovery of metals in a wide variety of solutions such as industrial wastewater, service water, environmental water, and production process water, has high durability, is easy to diversify, and can be processed into various forms.

BACKGROUND ART

With the expansion of high-tech industry, the ensuring of metal resources has become a serious problem. Metal elements including rare metals, such as rare earth elements, indium, niobium, and manganese, as well as platinum metals, copper, zinc, aluminum, etc., are called "critical metals", which are extremely important key materials in various industries in Japan. However, these metal elements are not produced in Japan, and they are mostly dependent on imports. It is expected that the consumption of critical metals including rare metals will continue to significantly increase. However, their reserves are highly unevenly distributed in some areas, and also the price rapidly fluctuates depending on the social situation, etc. Therefore, the supply state is extremely unstable. The Ministry of Economy, Trade and Industry of Japan has had several discussions about the general strategy for the stable supply of rare metals since fiscal year 2008, and established the "Strategy for Ensuring Rare Metals" in 2009. In this strategy, together with the securing of foreign resources (exploration development), the development of alternate materials, and storage, the importance of recycling is mentioned. In addition, the utilization of so-called "urban mine", a vast quantity of metal resources, has also been drawing great attention. The Ministry of Environment and the Ministry of Economy, Trade and Industry established the "Study Group on Collection and Appropriate Treatment of Rare Metals from Used Small Home Electronics" in fiscal year 2008, and discussions are ongoing to promote the recovery and cyclic use of rare metal elements. Further, plating washing wastewater or metal processing wastewater also contains slight amounts of valuable metals. Considering the social situation surrounding metal resources, recovery and recycling from such wastewater are also important issues. In the construction of such a recovery/recycling system for valuable metals, the development and establishment of an efficient technique for the adsorption and separation of valuable metals have been urgently needed.

Generally, for the removal and recovery of metals, methods such as aggregation, coprecipitation, solvent extraction, and granular adsorbing materials have been used. In consideration of the facilities, environmental impact, and also recycling, a method that uses a granular adsorbing material, such as an ion-exchange resin or a chelating resin, is effective. These adsorbing materials have been widely used for the removal and recovery of metals. In particular, chelating resins have higher affinity than ion-exchange resins and thus can be regarded as optimal adsorbing materials (Non-patent Documents 1 to 4). A chelating resin is believed to be capable of adsorbing and recovering heavy metals in a solution having high concentrations of salts, which is difficult to do with an ion-exchange resin. Currently, chelating resins having various functional groups, such as an iminodiacetic acid group, a low-molecular-weight polyamine group, an aminophosphate group, an isothionium group, a dithiocarbamic acid group, and a glucamine group, are commercially available. Among them, a chelating resin having introduced thereinto an iminodiacetic acid group, which is applicable to the adsorption of a wide range of metals, has been mainly used. However, the iminodiacetic-acid-type chelating resin also captures alkaline earth elements, such as calcium, often contained in a large amount in a solution to be treated, thereby inhibiting the capture of the target element or reducing the separation efficiency. In addition, the power of the iminodiacetic-acid-type chelating resin to form a complex with a metal element is not so high. Accordingly, in actual use, it often happens that a high recovery rate is not obtained. If a chelating resin that does not capture alkaline earth elements, etc., and captures the metal element to be recovered selectively and reliably at high speed can be developed, a high-concentration recovery liquid (eluent) with less impurities can be obtained. This makes it possible to solve the problems related to the recovery rate, cost, purity increase, and the like in the valuable metal recovery process. In addition, the chelating resin after metal elution can be acid-cleaned and used again for adsorption, whereby the cost related to adsorption and recovery can also be reduced. However, as mentioned above, the iminodiacetic-acid-type chelating resin under the present circumstances has low selectivity and is susceptible to inhibition by coexisting elements, and thus is difficult to apply to the valuable metal recovery process, where a high-purity, high-concentration solution is required.

A chelating resin is a granular adsorbing material like activated carbon and ion-exchange resins. A water treatment technique using these granular adsorbing materials has already been established and is expected to be heavily used also in the future. However, because of its granular form, such a granular adsorbing material has to be packed in a specific can when used, and thus is sometimes difficult to apply to some conditions of use or some installation environments. In addition, the chelating resin has a low adsorption rate, and thus it is difficult to quickly treat a large amount of water. Therefore, in order for such a chelating resin to satisfy various requirements, as well as the improvement of metal adsorption characteristics, the diversification of the adsorbing material form also has to be considered.

In order to solve such problems, some methods for producing a fibrous chelating adsorbing material that can be easily processed into various forms and can meet various demands have been disclosed. Patent Document 1 discloses a method for introducing a chelating functional group into fibers using a chemical grafting method. Patent Document 2 and Patent Document 3 disclose a method for introducing a chelating functional group into fibers by radiation exposure using a radical formation/graft polymerization method. Patent Document 4 discloses a method for injecting a low-molecular-weight chelating agent into general-purpose fibers under high-temperature and high-pressure conditions. These chelating fibers have sufficient functions and a high adsorption rate, and thus it is expected that a quick treatment is possible. However, there are problems in production. In a chemical grafting method, the kind of graftable fiber is limited, and also the production process is complicated. A radiation grafting method is advantageous in that it can be applied to various fibers unlike the chemical grafting method. However, for the handling of radiation, the operation is performed in a specific environment, and thus it cannot be regarded as a simple and inexpensive production method. In addition, although a chelating agent injection/impregnation method is also advantageous in that various fibers can be used, because this is an impregnation method under high-temperature and high-pressure conditions, the general versatility is low.

Patent Document 5 discloses a method for producing a fibrous metal-adsorbing material using a blend spinning method. According to this method, a long-chain ligand (a metal-adsorbing compound having a long molecular chain) is subjected to wet blend spinning together with viscose, which allows for mass production at low cost using existing facilities. This fibrous metal-adsorbing material, as formed into a nonwoven fabric, shows metal adsorption capacity that depends on the amount of blend spinning. Therefore, metal-adsorbing materials in various forms can be produced (Patent Document 6). This production method is simple. At the same time, metal adsorption characteristics can also be diversified by changing the long-chain ligand to be mixed. In addition, the fibrous metal-adsorbing materials disclosed in Patent Documents 5 and 6 are not only superior in terms of production methods, but also characterized in that because of the use of a long-chain ligand, they have higher complex-forming ability together with higher element selectivity as compared with iminodiacetic-acid-type chelating resins. Further, because metal-adsorbing functional groups are present only on the fiber surface, they are also characterized in that as compared with a granular adsorbing material having metal-adsorbing functional groups also inside the pores, even when the dipping rate is increased, the metal-adsorbing ability does not decrease. However, generally, a solution to be treated, from which metals are recovered, is an acidic solution containing hydrochloric acid, sulfuric acid, nitric acid, etc. Rayon is decomposed when exposed to high acidity. Therefore, the fibrous metal-adsorbing materials using rayon as the matrix disclosed in Patent Document 5 and Patent Document 6 are limited in use under acidic conditions. In addition, rayon is decomposed also by microorganisms in the environment, etc. Therefore, there are problems in that they cannot withstand continuous use over a long period of time or several cycles of reuse.

PRIOR ART DOCUMENTS

Patent Documents

[Patent Document 1] JP-A-2001-113272
[Patent Document 2] Japanese Patent No. 4119966
[Patent Document 3] Japanese Patent No. 3247704
[Patent Document 4] JP-A-2007-247104
[Patent Document 5] JP-A-2011-056349
[Patent Document 6] JP-A-2011-056350

Nonpatent Documents

[Nonpatent Document 1] Nobumasa HOJO, "*Kireto Jushi/Ion-Kokan Jushi* (Chelate Resin/Ion-Exchange Resin)", Kodansha Scientific (1976)
[Nonpatent Document 2] Manabu SENOO, Mitsuo ABE, Takashi SUZUKI, "*Ion-Kokan, Kodo-Bunri Gijutsu no Kiso* (Ion Exchange, Foundation of Advanced Separation Technology)", Kodansha Scientific (1991)
[Nonpatent Document 3] Naoki TOSHIMA, Tsuyoshi ENDO, Ryuichi YAMAMOTO, "*Kinosei Kobunshi Zairyo no Kagaku* (Chemistry of Functional Polymer Materials)", Asakura Publishing (1998)
[Nonpatent Document 4] Yasushi KANZAKI Ed., Japan Society of Ion Exchange, "*Saisentan Ion-Kokan Gijutsu no Subete* (All about Latest Ion-Exchange Techniques)", Kogyo Chosakai Publishing (2009)

SUMMARY OF THE INVENTION

Problems that the Invention is to Solve

The present invention has been accomplished in view of the problems mentioned above. An object of the invention is to provide a fibrous metal-adsorbing material used for the adsorption and recovery of metals in a solution, which can be produced using existing production facilities without using special facilities or complicated operations, has high durability, is easy to diversify, and can be processed into various forms.

Means for Solving the Problems

The present inventors have conducted intensive research. As a result, they have found that a fibrous metal-adsorbing material that has high durability, is easy to diversify, and can be processed into various forms can be produced by spinning an acrylate polymer having a large number of glycidyl groups and a low-melting-point fiber matrix polymer having a melting point of 200° C. or less by a melt-blend spinning method into a fibrous form, and then allowing a long-chain ligand having an amino group or an imino group to react with glycidyl groups on the fiber surface to introduce a metal-adsorbing functional group.

The present invention relates to a fibrous metal-adsorbing material characterized by being produced by spinning an acrylate polymer having a large number of glycidyl groups and a low-melting-point fiber matrix polymer having a melting point of 200° C. or less by a melt-blend spinning method into a fibrous form, and then allowing a long-chain ligand having an amino group or an imino group to react with glycidyl groups on the fiber surface to introduce a metal-adsorbing functional group.

In the present invention, the long-chain ligand having an amino group or an imino group to react with glycidyl groups of a fiber having mixed therewith an acrylate polymer having a large number of glycidyl groups obtained by melt-blend spinning is selected from the following materials: polyethyleneimine, polyallylamine, and partially carboxymethylated products thereof.

In the present invention, the acrylate polymer having a large number of glycidyl groups is a homopolymer or copolymer of an acrylate monomer having a glycidyl group.

In the present invention, the low-melting-point fiber matrix polymer having a melting point of 200° C. or less is selected from the following materials: polyethylene, polypropylene, poly[ethylene-vinyl acetate], and poly[ethylene-vinyl alcohol].

Incidentally, these requirements will be described in detail in the Mode for Carrying Out the Invention.

Advantage of the Invention

According to the present invention, by a simple method including a) a step of preparing an acrylate polymer having a large number of glycidyl groups in the molecule, b) a step of kneading a low-melting-point fiber matrix polymer therewith, c) a step of making the resulting mixture into a fibrous form by an melt-blend spinning method, and d) a step of allowing a long-chain ligand having an amino group or an imino group to react with glycidyl groups on the fiber surface to introduce a metal-adsorbing functional group, a fibrous metal-adsorbing material that has high durability, is easy to diversify, and can be processed into various forms can be produced.

MODE FOR CARRYING OUT THE INVENTION

Figure 1:
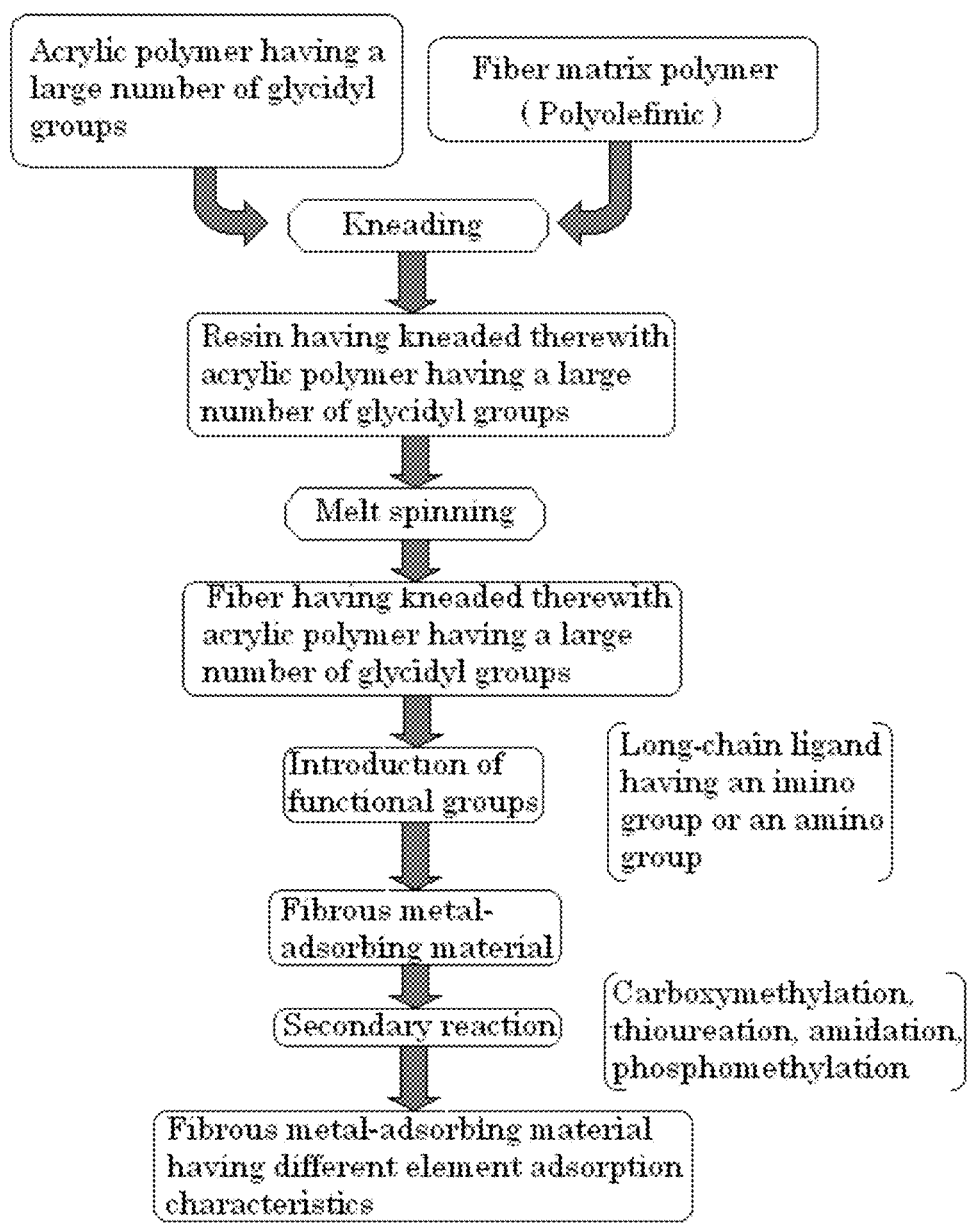
FIG. 1 shows a standard production process for the fibrous metal-adsorbing material of the invention.

The present invention is characterized in that, as shown by the standard production process for the fibrous metal-adsorbing material of FIG. 1, an acrylate polymer having a large number of glycidyl groups and a low-melting-point fiber matrix polymer are spun by a melt-blend spinning method into a fibrous form, and then a long-chain ligand having an amino group or an imino group is allowed to react with glycidyl groups on the fiber surface to introduce a metal-adsorbing functional group, thereby producing a fibrous metal-adsorbing material that has high durability, is easy to diversify, and can be processed into various forms.

The acrylate polymer having a large number of glycidyl groups used in the present invention is a homopolymer of an acrylate monomer having a glycidyl group that can react with an amino group or an imino group, or alternatively a copolymer of an acrylate monomer and a copolymerizable monomer. Examples of acrylate monomers having a glycidyl group include glycidyl acrylate and glycidyl methacrylate. In the present invention, the homopolymer or copolymer of an acrylate monomer is kneaded with a low-melting-point fiber matrix polymer and subjected to melt-blend spinning. Examples of monomers copolymerizable with an acrylate monomer include styrene, acrylates having no glycidyl group, methacrylates having no glycidyl group, acrylamide, and methacrylamide. In the case where the proportion of such a copolymerizable monomer is high, the glycidyl group content is low, resulting in a reduced amount of metal-adsorbing functional groups introduced. Therefore, the proportion of the acrylic monomer having a glycidyl group in the acrylate polymer having a large number of glycidyl groups is 10 to 100% by weight, preferably 20 to 100% by weight. In addition, although the molecular weight of the acrylate polymer having a large number of glycidyl groups is not particularly limited, in the case where the molecular weight is high, the polymer is highly brittle, leading to a decrease in kneading properties and spinning properties, and also the resulting adsorbing material has low flexibility. In the invention, those having a molecular weight of 10,000 to hundreds of thousands, which are easy to synthesize and easily available, are used.

In the present invention, as the low-melting-point fiber matrix polymer to be subjected to melt-blend spinning together with the acrylate polymer having a large number of glycidyl groups, a fiber matrix polymer having a melting point of 200° C. or less is used. Generally, a glycidyl group is decomposed at 200° C. or more, and thus the object of the present invention cannot be achieved when melt-blend spinning is performed with a fiber matrix having a melting point of more than 200° C. As the low-melting-point fiber matrix polymer having a melting point of 200° C. or less, polyethylene, polypropylene, poly[ethylene-vinyl acetate], or poly[ethylene-vinyl alcohol] is used. These fiber matrix polymers are impervious to acid or alkali in ordinary solutions to be treated and also have solvent resistance. Therefore, they are suitable as fiber matrix polymers for a high-durability fibrous metal-adsorbing material. In addition, although the chemical resistance is slightly lower than these olefinic fiber matrix polymers, Nylon 11 and Nylon 12 are also usable as the fiber matrix polymer of the present invention.

The metal adsorption capacity of the fibrous metal-adsorbing material of the present invention depends on the proportion of the acrylate polymer having a large number of glycidyl groups mixed with the low-melting-point fiber matrix polymer and also the amount of the long-chain ligand having an amino group or an imino group introduced to react with glycidyl groups. In the case where the proportion of the acrylate polymer having a large number of glycidyl groups mixed is low, the amount of the long-chain ligand having an amino group or an imino group introduced is small, resulting in low metal adsorption capacity. Therefore, with respect to the proportion of the acrylate polymer having a large number of glycidyl groups mixed, the higher the better. However, because the acrylate polymer having a large number of glycidyl groups used in the present invention is highly brittle, when the mixing proportion is increased, the spinning properties are deteriorated, making it impossible to perform drawing. In addition, even when spinning can be performed, the resulting fiber may have poor flexibility, making fabrication difficult. Further, the acrylate polymer having a large number of glycidyl groups is partially incorporated into the low-melting-point fiber matrix polymer, and thus the long-chain ligand having an amino group or an imino group cannot be introduced into all the glycidyl groups in the mixed acrylate polymer. In the present invention, the mixing ratio between the acrylate polymer having a large number of glycidyl groups and the fiber matrix polymer is 5:95 to 60:40, preferably 10:90 to 50:50.

The introduction of metal-adsorbing functional groups into a fiber containing the acrylate polymer having a large number of glycidyl groups can be performed using a known glycidyl group reaction. Various metal-coordinating low-molecular-weight compounds that serve as metal-adsorbing functional groups are known, and many of them can be introduced into a glycidyl group. However, the introduction of a low-molecular-weight ligand is hardly effective in terms of the stability constant of a metal complex and the degree of freedom of functional groups. In the present invention, in order to improve the stability constant of a metal complex, the degree of freedom of functional groups, element selectivity, and the rate of adsorption/desorption, a long-chain ligand having a main chain made of an element such as C, N, or O with a length of 12 or more atoms is introduced as a metal-adsorbing functional group.

The first mode of the long-chain ligand having an amino group or an imino group for introducing a metal-adsorbing functional group into a fiber having mixed therewith an acrylate polymer having a large number of glycidyl groups is polyethyleneimine or polyallylamine. These polyamines functions as metal-adsorbing functional groups for transition metal elements. In addition, they function as anion-exchange groups to contribute to the enhancement of the adsorption power of molybdic acid or tungstic acid, and are also effective in the adsorption of gold or platinum under acidic conditions. These polyamines have a large number of amino groups or imino groups and can react with a plurality of glycidyl groups on the fiber surface, and thus are introduced in such a manner that the surface of the fiber matrix is covered therewith. As a result, the problem of water repellency due to the fiber matrix is reduced, and it becomes possible to efficiently adsorb and recover metals from an aqueous solution.

The second mode of the long-chain ligand having an amino group or an imino group for introducing a metal-adsorbing functional group into a fiber having mixed therewith an acrylate polymer having a large number of glycidyl groups is polyethyleneimine or polyallylamine with the nitrogen atoms being partially carboxymethylated to retain an amino group or an imino group. They show metal adsorption characteristics like iminodiacetic acid and ethylenediaminetetraacetic acid. As the partial carboxymethylation to retain an amino group or an imino group, it is possible that carboxymethylation is performed after protective groups are previously attached to some amino groups or imino groups. Alternatively, it is also possible that the proportion of a carboxymethylating reagent (usually halogenated acetic acid) relative to amino groups or imino groups of polyethyleneimine or polyallylamine is reduced, and then the reaction is carried out. The adjustment of the degree of carboxymethylation makes it possible to improve the selectivity for molybdic acid, tungstic acid, etc. Incidentally, also in the case where a partially carboxymethylated polyamine is allowed to react, because a plurality of amino groups or imino groups are present, introduction is performed in such a manner that they react with a plurality of glycidyl groups on the fiber surface, and the fiber matrix surface is covered.

The introduction of a metal-adsorbing functional group into a fiber having mixed therewith an acrylate polymer having a large number of glycidyl groups is performed by immersing the fiber having mixed therewith an acrylate polymer having a large number of glycidyl groups in a solution containing the long-chain ligand having an amino group or an imino group to cause a reaction. By the reaction between a glycidyl group and an amino group or an imino group, the long-chain ligand is bonded to the acrylate polymer having a large number of glycidyl groups. At this time, the long-chain ligand reacts only with glycidyl groups that are present on the fiber surface, and thus metal-adsorbing functional groups are introduced only into the fiber surface. This provides a fibrous metal-adsorbing material with a high adsorption/desorption rate. In order to improve reactivity with a long-chain ligand, the fiber containing the acrylate polymer having a large number of glycidyl groups may be previously treated with hydrochloric acid to convert glycidyl groups into chlorohydrin. The solution to dissolve the long-chain ligand may be an aqueous solution, but the reaction rate of the long-chain ligand may decrease because a polyolefinic polymer is strongly water-repellent. Therefore, it is preferable that the reaction is carried out in an alcohol solution or an aqueous solution containing alcohol, in which the acrylate polymer having a large number of glycidyl groups is not dissolved or eluted. Further, the solution may also be heated as necessary. The reaction to introduce the long-chain ligand is relatively quick. Therefore, it is possible to immerse the spun fiber in a dip bath filled with a long-chain ligand solution to introduce the long-chain ligand. In addition, it is also possible to make the fiber into a nonwoven fabric, and then introduce the long-chain ligand by the same dipping method. Naturally, this long-chain ligand introduction may be a continuous process or a batch process. The fiber after the reaction has unreacted glycidyl groups remaining therein. Such a fiber may be treated with alkali or acid to introduce a hydroxyl group, or may also be post-treated to introduce ionic functional groups, such as an amino group, a carboxyl group, and a sulfo group, and further a compound that serves as a low-molecular-weight ligand. By such a post-treatment, the water repellency due to the fiber matrix polymer can be further reduced, and also the metal adsorption characteristics can be improved by the secondary effects.

Next, the present invention will be described with reference to the examples. However, the present invention is not limited thereto.

Example 1

(1) Kneading of Glycidyl-Group-Containing Polymer and Polyethylene 7.0 kg of a low-density polyethylene powder (manufactured by Seishin Enterprise Co., Ltd., SK-PE-20L, average particle size: about 20 µm) and 3.0 kg of an acrylate polymer having a large number of glycidyl groups (manufactured by NOF Corporation, MARPROOF, molecular weight: about 12,000, epoxy value: 170 g/eq) were premixed. The premixed resin powder was fed to a twin-screw kneader (manufactured by Seishin Enterprise Co., Ltd., PMT32-30) and kneaded at 180° C., and, using a pelletizer, polyethylene having kneaded therewith an acrylate polymer having a large number of glycidyl groups was obtained. Some of the obtained polyethylene having kneaded therewith an acrylate polymer having a large number of glycidyl groups was taken and dried at 50° C. for 24 hours.

(2) Melt-Blend Spinning

Figure 2:
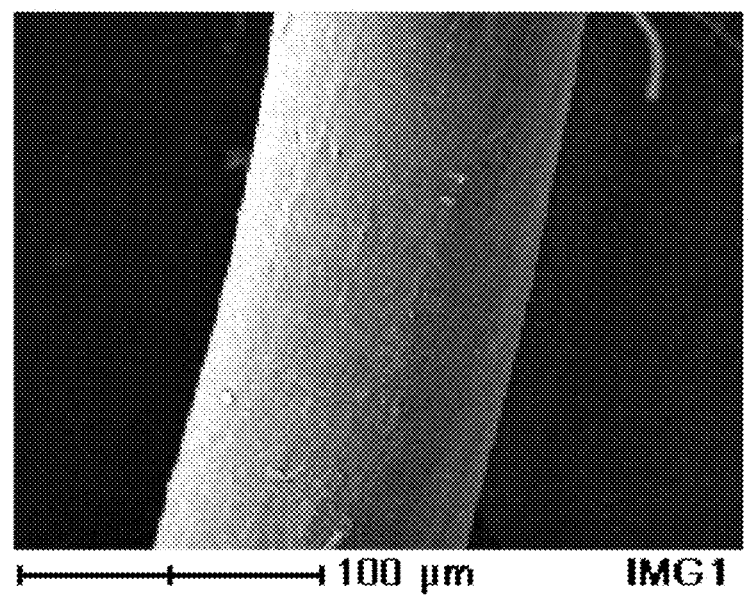
FIG. 2 shows an electron micrograph of a polyethylene fiber having mixed therewith an acrylate polymer having a large number of glycidyl groups obtained in Example 1.

Melt spinning was performed using, as a raw material, the polyethylene obtained in (1) having kneaded therewith an acrylate polymer having a large number of glycidyl groups. Spinning was performed at a spinning temperature of 180° C., a nozzle temperature of 190° C., a nozzle diameter of 0.8 mm, and a discharge rate of 0.5 g/min to give a fiber having a fiber diameter of 80 µm. FIG. 2 shows an electron micrograph of the obtained polyethylene fiber having mixed therewith an acrylate polymer having a large number of glycidyl groups.

(3) Introduction of Metal-Adsorbing Functional Groups

Figure 3:
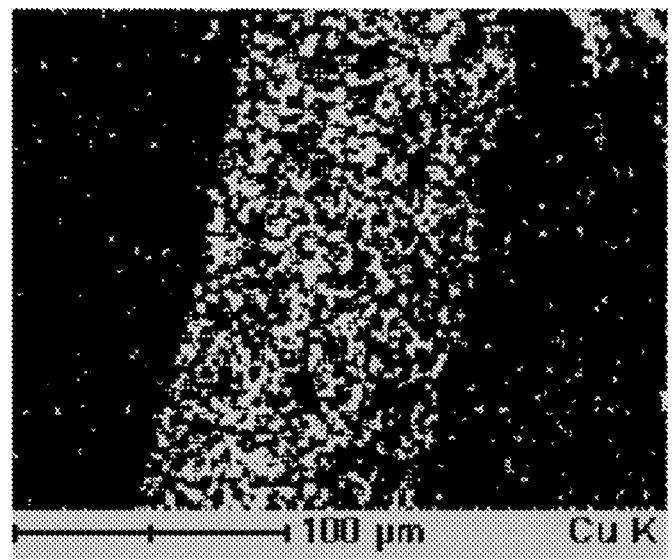
FIG. 3 shows an EDX pattern of copper measured by an energy dispersive X-ray fluorescence spectrometer after the adsorption of copper on a fibrous metal-adsorbing material having introduced thereinto pentaethylenehexamine obtained in Example 1.

The fiber obtained in (2) above was cut by a cutting machine to about 50 mm into staple fibers. The cut staple fibers were immersed in an isopropyl alcohol solution containing 20% pentaethylenehexamine maintained at 40° C. to introduce pentaethylenehexamine. The reaction was followed by washing with pure water, thereby giving a fibrous metal-adsorbing material having introduced thereinto pentaethylenehexamine. The obtained fibrous metal-adsorbing material was immersed in a 0.5 M copper sulfate solution (adjusted to pH 5.5) to adsorb copper. The amount of copper adsorbed was 0.54 mmol Cu/g. FIG. 3 shows the EDX pattern of the copper-adsorbed fibrous metal-adsorbing material measured by an energy dispersive X-ray fluorescence spectrometer. As is clear from FIG. 3, copper was uniformly adsorbed on the surface of the fibrous adsorbing material. The obtained fibrous metal-adsorbing material was immersed in 3 M nitric acid for 50 hours and then washed with water, and the amount of copper adsorbed was determined again. The amount of metal adsorption did not decrease even after the immersion in nitric acid and washing, and a decrease in performance under acidic conditions was not observed.

Example 2

A polyethylene fiber having mixed therewith an acrylate polymer having a large number of glycidyl groups in an amount of 10% was prepared by the same method as in Example 1. The raw materials and the spinning conditions used were the same as in Example 1, except for the proportion of the acrylate polymer having a large number of glycidyl groups mixed. Pentaethylenehexamine was introduced by the same method as in Example 1, (3), thereby giving a fibrous metal-adsorbing material. The amount of copper adsorbed was 0.28 mmol Cu/g.

Example 3

Into the polyethylene fiber prepared in Example 1 having mixed therewith an acrylate polymer having a large number of glycidyl groups in an amount of 30%, partially carboxymethylated polyethyleneimine obtained by carboxymethylating polyethyleneimine (manufactured by Wako Pure Chemical Industries, molecular weight: 10,000) with chloroacetic acid in an amount of 0.8 molar equivalents relative to the nitrogen amount was introduced by the same method as in Example 1, (3). The amount of copper adsorbed on the resulting fibrous metal-adsorbing material having introduced thereinto partially carboxymethylated polyethyleneimine was 0.45 mmol Cu/g.

INDUSTRIAL APPLICABILITY

According to the present invention, by a simple method including a) a step of preparing an acrylate polymer having a large number of glycidyl groups in the molecule, b) a step of kneading a low-melting-point fiber matrix polymer therewith, c) a step of making the resulting mixture into a fibrous form by an melt-blend spinning method, and d) a step of allowing a long-chain ligand having an amino group or an imino group to react with glycidyl groups on the fiber surface to introduce a metal-adsorbing functional group, a fibrous metal-adsorbing material that has high durability, is easy to diversify, and can be processed into various forms can be produced. In addition, various compounds can be introduced into the amino groups or imino groups of the fibrous metal-adsorbing material having a polyamine compound introduced into glycidyl groups on the fiber surface thereof. Therefore, it is possible to produce a fibrous metal-adsorbing material that can be not only diversified in form but also provided with various adsorption characteristics.

Further, by a post-treatment, a hydrophilic group, an ionic group, or a low-molecular-weight coordinating functional group can be introduced into the remaining glycidyl groups after the introduction of metal-adsorbing functional groups. Therefore, it is also possible to develop distinctive metal adsorption characteristics according to the metal to be adsorbed and recovered or the coexisting elements. The fibrous metal-adsorbing material obtained by the present invention has high flexibility and can be easily processed into a cloth, such as a woven fabric, a knitted fabric, or a nonwoven fabric. By fabricating such a cloth, it is possible to produce metal adsorbents having various forms suitable for the recovery of valuable metals or the removal of heavy metals.

The invention claimed is:

1. A fibrous metal-adsorbing material characterized by being produced by spinning an acrylate polymer having glycidyl groups and a low-melting-point fiber matrix polymer having a melting point of 200° C. or less by a melt-blend spinning method into a fibrous form, and then allowing a ligand having an amino group or an imino group to react with glycidyl groups on a fiber surface to introduce a metal-adsorbing functional group, wherein
   a proportion of an acrylic monomer having the glycidyl group in the acrylate polymer is 10 to 100% by weight, and
   the ligand has a main chain with length of 12 or more atoms.

2. The fibrous metal-adsorbing material according to claim 1, wherein the ligand having an amino group or an imino group is selected from the following materials: polyethyleneimine, polyallylamine, and partially carboxymethylated products thereof.

3. The fibrous metal-adsorbing material according to claim 1, wherein the acrylate polymer having the glycidyl groups is a homopolymer or copolymer of an acrylate monomer having a glycidyl group.

4. The fibrous metal-adsorbing material according to claim 1, wherein the low-melting-point fiber matrix polymer having a melting point of 200° C. or less is selected from the following materials: polyethylene, polypropylene, poly[ethylene-vinyl acetate], and poly[ethylene-vinyl alcohol].

* * * * *